United States Patent
He et al.

(10) Patent No.: US 10,460,274 B2
(45) Date of Patent: Oct. 29, 2019

(54) ENERGY DISAGGREGATION TECHNIQUES FOR WHOLE-HOUSE ENERGY CONSUMPTION DATA

(71) Applicants: Ye He, Mountain View, CA (US); Abhay Gupta, Cupertino, CA (US); Hsien-Ting Cheng, San Jose, CA (US); Vivek Garud, Cupertino, CA (US)

(72) Inventors: Ye He, Mountain View, CA (US); Abhay Gupta, Cupertino, CA (US); Hsien-Ting Cheng, San Jose, CA (US); Vivek Garud, Cupertino, CA (US)

(73) Assignee: Bidgely Inc., Mountain View, CA (US)

( * ) Notice: Subject to any disclaimer, the term of this patent is extended or adjusted under 35 U.S.C. 154(b) by 549 days.

(21) Appl. No.: 14/543,824

(22) Filed: Nov. 17, 2014

(65) Prior Publication Data
US 2015/0142695 A1    May 21, 2015

Related U.S. Application Data

(60) Provisional application No. 61/905,694, filed on Nov. 18, 2013.

(51) Int. Cl.
*G06Q 10/06* (2012.01)
*G06N 20/00* (2019.01)
*G06Q 50/06* (2012.01)

(52) U.S. Cl.
CPC .......... *G06Q 10/067* (2013.01); *G06N 20/00* (2019.01); *G06Q 50/06* (2013.01)

(58) Field of Classification Search
CPC ..... G06Q 10/067; G06Q 50/06; G06N 99/005
(Continued)

(56) References Cited

U.S. PATENT DOCUMENTS

| 4,858,141 A * | 8/1989 | Hart .................... G01R 21/1331 340/657 |
| 2011/0036343 A1 | 2/2011 | Kroyzer et al. |

(Continued)

OTHER PUBLICATIONS

Goncalve, Unsupervised disaggregation of appliance using aggregated consumption data, Aug. 2011.*

(Continued)

*Primary Examiner* — Michael P Nghiem
*Assistant Examiner* — Dacthang P Ngo
(74) *Attorney, Agent, or Firm* — Landmark Intellectual Property Law, PLLC (57) ABSTRACT

The present invention is directed to systems and methods for performing energy disaggregation of a whole-house energy usage waveform, based at least in part on the whole-house energy usage profile, training data, and predetermined generic models, including: a module for pairing impulses identified in the whole-house energy usage waveform to indicate an appliance cycle, pairing impulses with at least one up transition with at least one down transition; a module for bundling impulses that are representative of an appliance cycle; a classification module, which upon determination of a type of appliance associated with bundles, is configured to classify the bundles of transitions in accordance with bundles exhibited by similar appliances with similar characteristics; and utilizing such pairing module and module for bundling to perform energy disaggregation. Moreover, the present invention sets forth graphical user interfaces for the presentation of such data and the receipt of user-supplied validation and information.

14 Claims, 5 Drawing Sheets

(58) Field of Classification Search
USPC .............................................. 702/60, 57, 66
See application file for complete search history.

(56) References Cited

U.S. PATENT DOCUMENTS

| | | |
|---|---|---|
| 2011/0106787 A1 | 5/2011 | Waters et al. |
| 2012/0101653 A1* | 4/2012 | Tran ...................... G01D 4/004 |
| | | 700/296 |
| 2012/0197560 A1 | 8/2012 | Kuhns et al. |
| 2013/0110621 A1* | 5/2013 | Gupta .................... G01R 31/34 |
| | | 705/14.52 |
| 2013/0289788 A1 | 10/2013 | Gupta et al. |
| 2015/0012147 A1* | 1/2015 | Haghighat-Kashani ..................... |
| | | G06Q 30/02 |
| | | 700/291 |

OTHER PUBLICATIONS

Real-Time Recognition and profilling of appliances through a single electricity sensor, Jul. 2010.*
Hart, Nonintrusive Appliance Load Monitoring, 1992.*
International Preliminary Report on Patentability, dated May 26, 2016, 10 pages.
International Search Report, date of completion Jan. 23, 2015, 2 pages.

\* cited by examiner

ENERGY DISAGGREGATION TECHNIQUES FOR WHOLE-HOUSE ENERGY CONSUMPTION DATA

RELATED APPLICATIONS

The present invention claims priority to U.S. Provisional Patent Application No. 61/905,694, filed 18 Nov. 2013, which is incorporated herein in its entirety.

BACKGROUND

The present invention is generally directed to systems and methods of non-intrusive appliance load monitoring ("NIALM"). Specifically, the present invention is directed to demand side management for residential and small commercial electric energy usage, utilizing software analytics on whole house load profile data to disaggregate into individual appliances and loads.

Appliance load monitoring may be an effective way to communicate to users an amount of energy that may be required to use and run various appliances. Presenting users with such information in an understandable format may allow users to take appropriate action to actively reduce total energy consumption. Moreover, providing itemized information per specific appliance may also permit users to determine if acquiring a new or replacement appliance (for example, through purchase, lease, or rental) would reduce energy costs sufficient to validate such price of purchase, lease, or rental. NIALM may enable the breakdown of electricity usage for a property or whole house without entering the property or applying any sub-metering devices on the individual appliances, devices, and/or loads inside the property. In general, certain aspects of NIALM may be known in the prior art. For example, U.S. Pat. No. 4,858,141 to Hart et al. ("Hart") discusses basic techniques for performing NIALM, such as generating and using appliance load signatures to extract information for individual loads from whole property load profile data measured by the utility meter. As taught by Hart, information extracted from the utility meter may comprise: power consumption; times when the appliance/load was turned on and off; and/or appliance load and/or health.

There has been research in the area of NIALM and various papers have been published on techniques used to define load signatures and run pattern recognition algorithm on the load profile of the property under inspection. Typically, a software analysis is performed on past data collected. Therefore such prior art techniques may be useful in breaking down the energy usage or itemizing the electric energy bill post-consumption, but fail to provide near real-time information that may immediately or near immediately empower users to modify their energy usage. With regard to appliances such as heating or air conditioning—for which usage may be based upon immediate conditions—such data of previous usage may provide limited assistance in modifying present behavior and usage.

While the prior art may teach various devices for monitoring and determining power usage (for example, U.S. Patent Application Publication No. 2009/0045804 to Durling et al. ("Durling")), such devices generally require additional components to be installed or specific devices to be utilized. In addition, prior art techniques and devices have drawbacks in that such devices and techniques generally provide a relatively low confidence level of identifying specific appliances. Such techniques and devices typically do not utilize the most knowledgeable party—the user himself—and may also generally fail to account for additional non-electrical information that may be available.

SUMMARY OF THE INVENTION

Some aspects in accordance with some embodiments of the present invention may include a system for performing energy disaggregation of a whole-house energy usage waveform, based at least in part on the whole-house energy usage profile, training data, and predetermined generic models, comprising: a module for pairing impulses identified in the whole-house energy usage waveform to indicate an appliance cycle, pairing impulses comprising pairing at least one up transition with at least one down transition; and a module for bundling impulses to indicate paired impulses that are representative of an appliance cycle; and utilizing such pairing module and module for bundling to perform energy disaggregation.

Other aspects in accordance with some embodiments of the present invention may comprise a system for performing energy disaggregation of a whole-house energy usage waveform, based at least in part on the whole-house energy usage profile, training data, and predetermined generic models, comprising: a module for pairing impulses identified in the whole-house energy usage waveform to indicate an appliance cycle, pairing impulses comprising pairing at least one up transition with at least one down transition; and a module for bundling impulses to indicate paired impulses that are representative of an appliance cycle; a classification module, which upon determination of a type of appliance associated with bundles, is configured to classify the bundles of transitions in accordance with bundles exhibited by similar appliances with similar characteristics; and utilizing such pairing module and module for bundling to perform energy disaggregation.

Still other aspects in accordance with some embodiments of the present invention may comprise a graphical user interface displayed on a screen of a computing device for receiving user validation of identified appliance cycles, such appliance cycles determined based on disaggregating a whole-house profile, and for presenting to the user various data and analytics regarding disaggregation and determined appliances, the user interface comprising: a plurality of graphical interface pages arranged in a hierarchical format, wherein a dashboard presenting a user with information regarding current processing tasks is a parent page; and wherein the dashboard comprises links to child pages, the child pages presenting information related to total energy usage of a specific home, itemized appliance level data based on disaggregation results, requests for training inputs, requests for validation of determined appliances, notification or alert settings, performance analytics, and reports on itemized or total energy usage.

These and other aspects will become apparent from the following description of the invention taken in conjunction with the following drawings, although variations and modifications may be effected without departing from the scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

DETAILED DESCRIPTION OF THE INVENTION

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

Note that the methods in accordance with some embodiments of the present invention may utilize data or information that may retrieved from energy meters deployed in homes. For example, total energy consumption data may be retrieved through at least two mechanisms. First, systems in accordance with the present invention may be in selective communication with a utility, for example, by way of a utility portal. Accordingly, total energy consumption data may be retrieved directly from the utility.

Second, data may be obtained directly from the home. This may be accomplished, for example, through the use of a gateway device that may be positioned between the house electric meter and the systems of the present invention. Such devices may include, but are not limited to a Zigbee gateway that may connect with a digital Smart Meter, fetch total energy consumption and provide information regarding real-time or near real-time energy consumption; an infrared or visible LED sensor, which may be physically attached to a meter and detect energy consumption by counting pulses emitted by the LED (as visible light or infrared); or a CT clamp, as discussed above.

Regardless of the source of the information, data regarding total energy consumption may be sent to processors, servers, and data stores of systems in accordance with some embodiments of the present invention for subsequent processing and analysis.

In general, the present invention presents several processing techniques to improve energy disaggregation. Improvement of energy disaggregation may be configuring disaggregation for more accurate results, more timely results, quicker processing, etc. In general, such improvements may be broken into two categories: (i) improvements in energy disaggregation techniques; and (ii) improving the accuracy of energy disaggregation for a specific user or home. Each will be addressed in turn below.

Improvements in Energy Disaggregation Techniques

Even based algorithms may identify the start or end of an appliance through a change in instantaneous power consumption of the whole house signal. Various improvements may include (i) the use of pairing algorithms; (ii) bundling impulses; (iii) classifying bundles; (iv) using system generated eligible training; and (v) optimizing the disaggregation route selected. Each will be discussed in turn.

Figure 1:
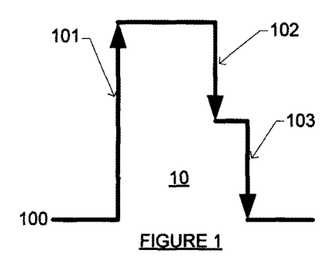
FIG. 1 depicts an exemplary scenario of pairing transitions to assist in disaggregation techniques, in accordance with some embodiments of the present invention.
Figure 2:
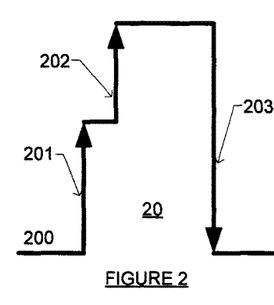
FIG. 2 depicts an exemplary scenario of pairing transitions to assist in disaggregation techniques, in accordance with some embodiments of the present invention.
Figure 3:
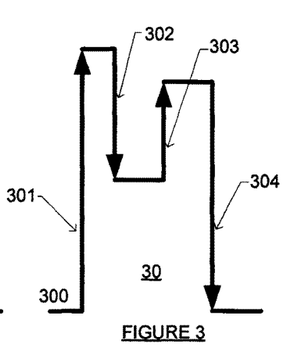
FIG. 3 depicts an exemplary scenario of pairing transitions to assist in disaggregation techniques, in accordance with some embodiments of the present invention.

Pairing Algorithm: Combining Primitive Elements to Impulses. The optimization process of combining primitive elements into impulses, or the "pairing" algorithm, may be used to initially pair one up and one down transition. In accordance with some embodiments of the present invention, one or more up transitions may be combined with one or more down transitions. Such combination may minimize the difference of consumption calculated from impulses to that calculated from raw time series. Due to the nature of data with different sampling rate and the fact that multiple appliances may be turned on or turned off at the same time, the use of a combination of multiple up transitions and multiple down transitions—rather than using a single up transition matched to a single down transition—may provide a more accurate optimization closer to actual consumption. With reference to FIGS. 1-3, various examples of scenarios requiring multiple pairing, in accordance with some embodiments of the present invention, may be seen.

For example, FIG. 1 illustrates a waveform 100 that comprises one (1) up transition 101 paired with two (2)

down transitions 102, 103. It can be seen that the up transition 101 and the down transitions 102, 103 are paired and result in a start and finish at base level. With reference to FIG. 2, two (2) up transitions 201, 202 may be paired with a one (1) down transition 203. FIG. 3 illustrates an up transition 301, with consecutively running down transition 302, up transition 303, and down transition 304. Appliances that may transmit such energy usage patterns are noted below.

In accordance with embodiments of the present invention, a Greedy algorithm and dynamic programming may be applied in order to search for the matching impulses that best match. A greedy algorithm may be an algorithm that follows a problem solving heuristic for making locally optimal choices at each stage, with the goal of finding global optimal choices. Moreover, historical impulses may be used as a seed or starting point in order to increase converging speed in searching for the best match.

Bundling: Combination of Impulses. In accordance with some embodiments of the present invention, bundling may be used to provide a unit for appliance classification. An ideal bundle may represent the operation of one appliance. Unsupervised cluster analysis may be used to combine multiple impulses. Mixed features of each impulse (including, but not limited to amplitude of up/down transition, impulse duration, overlap with other impulses, running timestamp, time of day, day of week, etc.) may be extracted to perform hierarchical clustering or other clustering analysis.

There can be various specifics that can impact the accuracy of the bundling. First, depending on the specific appliance and user behavior, the duration and running time of an appliance may greatly vary. However, the amount of power that the appliance consumes—the power amplitude—is often a more stable feature of an appliance in a given house. Using power amplitude may differentiate a large amount of appliances, for example refrigerators or HVAC units.

Second, some appliance may have a two stage of power amplitude, often due to different components or functions within the appliance. For example, this may be graphically represented as FIG. 2. For example, a dryer may include both a heating coil and a spinning motor, each with a different signature of power jump (for example, 201 and 202). Using other features such as overlap, co-occurrence of transitions may enable more accurate or intelligent impulse combination.

Third, situations may arise where there are two or more appliances with the same power amplitude. This may be graphically represented as FIG. 3. For example, a home may have two refrigerators with similar amplitude but having different on-time durations. The power amplitude of the refrigerators should be able to be separated into two clusters for better appliance itemization.

Fourth, the time of day of the up transition may be used as a feature identify certain appliances and clusters related to such appliances. For example, time of day may be used to find a cluster of pool pump impulses, due to the fact that pool pump is timer controlled and is generally turned on at the same time each day.

Classification of Bundles. In accordance with some embodiments of the present invention, bundles may be classified in various manners. For example, user segmentation may be performed based on the country, house size and zip code, in order to segment users into a few groups. A goal of bundle classification may be to make sure that the appliance behavior is more or less similar within one group, for example, a group of users with similar air conditioners with a similar Btu or a group of users with similar energy efficient refrigerators.

Models may also be trained utilizing library data. Trained data in the library may comprise bundles identified by human labeling or individual channel of data monitoring on one appliance. The label is usually one appliance name, for example: refrigerator, air conditioner, etc. The extracted features of one bundle may comprise: average power amplitude, average running duration, average duty cycle, etc. A generic model (GM) is trained for each appliance for users in each segmented groups.

The On/Off status of appliances may then be identified. For example, before classification of any bundle to a certain appliance label, the ON/OFF status detection of each appliance can be conducted for model selection during a certain period. Such status detection may be desirable due to the personal choices of the person controlling certain appliances, such as an air conditioner, or a central heater. The ON or OFF status of a model for an appliance may be marked as 1 or 0 as in the above table. Accordingly, $2^N$ Combinations of possible status of N appliance models can be applied and the one with best reasonable results may be chosen as final classification models.

| Appliance Type | Air Conditioner | Space Heater | Water Heater | Refrigerator | ... |
|---|---|---|---|---|---|
| Status 1: | 0 | 0 | 0 | 1 | ... |
| Status 2: | 1 | 0 | 1 | 1 | ... |
| ... | | | | | |

The metric of classification results may be measured by the percentage of disaggregation and the expected behavior of all appliances. For example, a water heater should have approximately uniform daily usage; HVAC should have some usage correlated to temperature, etc.

Next, the bundles identified may be classified. For example, for any user a generic model of one group may be selected based on user segmentation. Identification of ON/OFF status of any appliance in a certain period may then be performed. Final classification for each bundle of a user in a given period is performed on the final applicable generic model.

Figure 4:
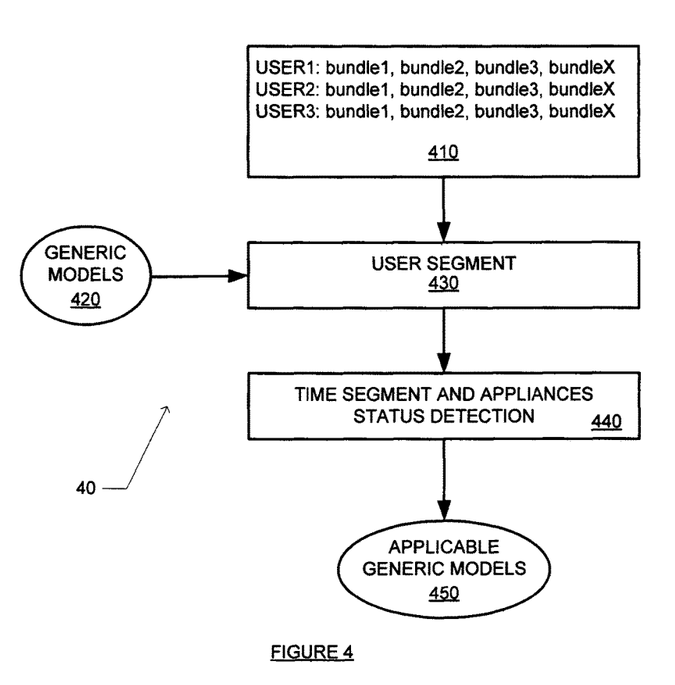
FIG. 4 illustrates an exemplary selection process of generic models for a certain user and/or time range, in accordance with some embodiments of the present invention.

With reference to FIG. 4, an exemplary selection process in accordance with some embodiments of the present invention for generic models for certain users and a time range is depicted. Multiple appliances may be identified as separate, and may be labeled during bundling. For example an oven and an air conditioner, or a clothes dryer and a water heater. The complexity of a start time difference between two or more appliances may be considered and further itemization may be required.

With continued reference to FIG. 4, a process 40 of determining applicable generic models in accordance with some embodiments of the present invention will now be discussed. Bundled transitions 410 as well as generic models 420 may be provided to a user segment 430. The user segment 430 may convey this information to a module 440 in which time segments may be determined and statuses of appliances identified in the bundles of transitions may be detected. Based upon this information, applicable generic models may be output by the system at 450 in order to be used for efficient and accurate disaggregation.

Figure 5:
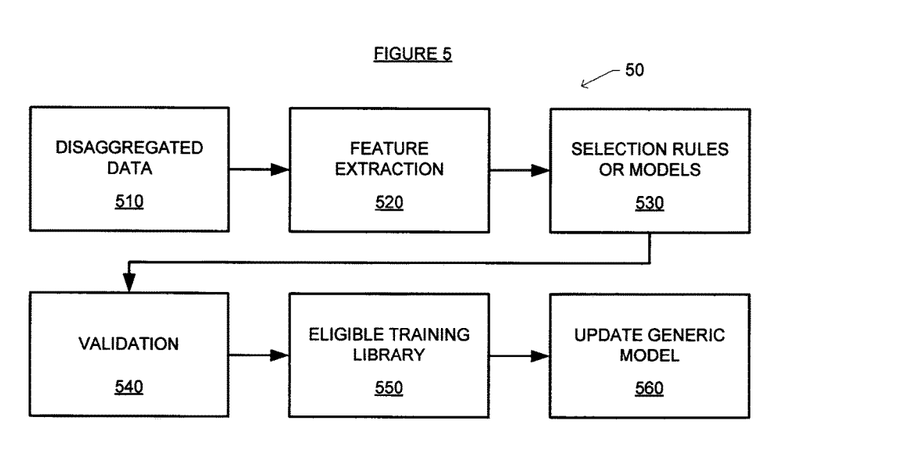
FIG. 5 depicts an exemplary process for system generated eligible training, in accordance with some embodiments of the present invention.

System Generated Eligible Training. In order to increase the accuracy and coverage of a classification model, a large scale library of appliance training data may be automatically built. Results from disaggregating data from a large number of users may be characterized using features related to disaggregation quality—for example, classified confidence score, power variation in running cycles, consistency degree based on historical data, etc. A rule or a model based on such features may then be created to make a decision on the eligibility of entering the data into training library. Systems and methods in accordance with some embodiments of the present invention may require or desire human validation before entering training data and updating a generic model. Efficient human validation may assist in improving selection rules or models. With reference to FIG. 5, a flow process 50 in accordance with some embodiments of the present invention for system generated training for large-scale data collection is depicted and will now be discussed.

At 510 energy usage data may be disaggregated, and such data may be provided to a module 520 to extract features from the data. As noted above, features may include elements such as, but not limited to classified confident scores, power variation, consistency degrees based on historical data, etc. Based at least in part upon such features identified or extracted from the data, rules or models (such as generic models) may then be selected. It is optional, but considered by the present invention, that human validation may be desired or required at 540, in which a user may confirm or prevent such data from being added to the training library. If such addition is confirmed and validated at 540, then at 550 such information may be added to the eligible training library, and at 560 the generic models that rely on such training library may be updated.

Optimization of Disaggregation Route. Various disaggregation processes in accordance with some embodiments of the present invention may generally include several fundamental data processes: detection of primitive transitions, pairing of transitions into impulses, bundling, and classification. Each major process may have different algorithms to fulfill the task. Different algorithms may each have its own advantages and disadvantages based on the type of data, and may have different running time and accuracy trade-offs. Accordingly, optimization of a disaggregation route may be conducted to search for the optimal algorithm for each major process for different type of users and data.

Figure 6:
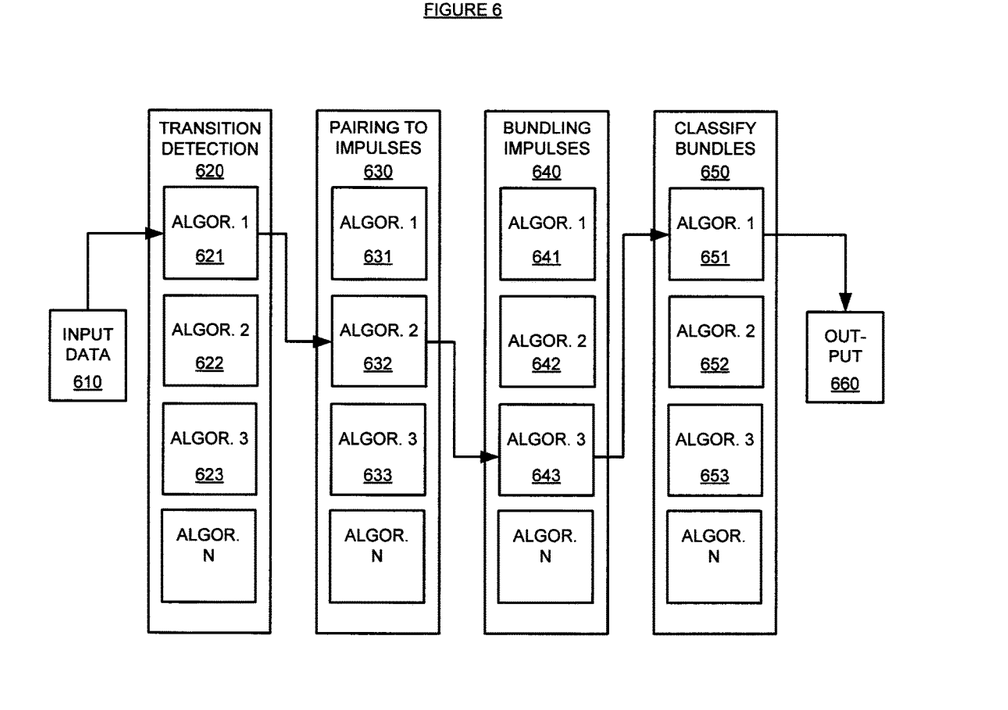
FIG. 6 depicts an exemplary process for optimizing a disaggregation route, in accordance with some embodiments of the present invention.

With reference to FIG. 6, a flow chart 60 illustrating one example of a possible optimized disaggregation route in accordance with some embodiments of the present invention is depicted. FIG. 6 illustrates a flow chart 60 in which data is initially input into a system at 610. The system then performs various processing steps on the data, for example including but not limited to detection of transitions 620, pairing of impulses 630, bundling of impulses 640, classification of bundles 650, and outputting disaggregation results 660. It is understood that each of these processing steps may be performed in a plurality of ways.

Each of these options, or algorithms, may yield data that may be slightly different in accuracy, processing time, etc. Accordingly, in order to optimize disaggregation, various pathways through such options may be determined by the system. With continued reference to FIG. 6, detection of transitions 620 may include three algorithms 621, 622, 623 for detecting transitions. Pairing of impulses 630 may be accomplished through (for example) three different mechanisms 631, 632, 633. Similarly, bundling of impulses 640 may be performed by a number of algorithms 641, 642, 643 and bundles may be classified based upon different techniques 651, 652, 653.

Based at least in part upon advantages and disadvantages of each processing technique—and requirements related to running time and accuracy—different pathways through the processing may be selected. For example, as illustrated in FIG. 6, algorithm 621 may be used for the detection of transitions, algorithm 632 may be used for the pairing of impulses, algorithm 643 may be used to bundle impulses, and algorithm 651 may be used to classify bundles. Accordingly, optimization of a disaggregation route may be conducted to search for the optimal algorithm for each major process for different type of users and data.

Making Energy Disaggregation More Accurate for Each User/Home.

Even if a generic model is trained and applied based on user/house segmentation, not all houses within the same segment operate identically. Moreover, generic models are generally designed and optimized for global accuracy, not for individual homes. The following reasons may contribute to the generic solution not working on all houses: (a) appliances with similar amplitudes cause confusion for systems with amplitude as the main feature for appliance classification; and (b) deviation of appliance signatures from the typical nature and use of the appliance due to several factors (appliance health, settings or consumer behavior on using the appliance). A few examples of such behavior may include (i) a user using AC when its fairly cool—for most other houses this may be classified as a heater; (ii) a water heater that is so inefficient that it starts looking like an AC or a space heater; and/or (iii) a water heater being used very actively in a house and its signature begins to look like an air conditioner.

There are several solutions that may assist in solving the above problem. For example: (1) house specific models and consistent disaggregation; (2) user training; and (3) real time appliance disaggregation.

House Specific Models (HSM) and Consistent Disaggregation. In order to boost disaggregation accuracy for various houses, data may be continuously streamed causing the disaggregation model to morph toward house specification. A House Specific Model (HSM) may be designed for this purpose. In addition, as opposed to each pattern (or bundle) being classified independently—which may result in inconsistent results—classification decisions may be made jointly and substantially simultaneously for all patterns (within a given time period). Note that inconsistencies generally occur when a pattern exists around a decision boundary—for example, the decision boundary of 65 degrees between air conditioning and heating.

Figure 7:
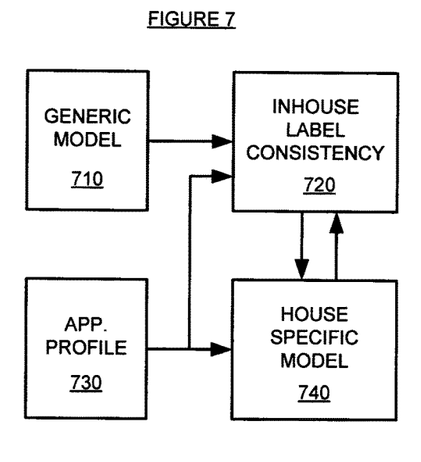
FIG. 7 illustrates an exemplary data flow that may incorporate in-house consistency, in accordance with some embodiments of the present invention.

A house specific model may be updated incrementally, starting from highly confident bundles output from a generic model. This may occur after each disaggregation task, and the classified bundles may then be used to retrain (or update) the HSM according to its confidence score. With reference to FIG. 7, a data flow 70 in accordance with some embodiments of the present invention is depicted.

In general the process may be designed to enhance accuracy and consistency by using information such as, but not limited to:
  a. Prediction based on generic model
  b. Prediction based on a house specific model (HSM), if such HSM exists
  c. User provided appliance profile (example, if user says he has no air conditioning, the system will give heavy penalty to prediction of this pattern to be air conditioning)
  d. User provided appliance training
  e. Rules for neighboring patterns. Some examples:

e.i. Penalty if there is a prediction of air conditioning and heater running at the same time or even very close in time with each other).

e.ii. Penalty if there are two air conditioners predicted at different amplitudes but user profile says he has only one air conditioners.

With reference to FIG. 7, a generic model 710 may be determined to be applicable to the relevant data, and may receive a determined confidence score. Such information may be provided to a processing module to provide in-house label consistency 720, which may utilize information from determined appliance profiles to continually update and evolve (through multiple iterations) a house specific model. This may be updated from information such as user-provided training data (as discussed below), or from various rules that may be applied to confirm consistency in the disaggregation approach. For example, as noted above, it is unlikely that an air conditioning unit and a heater would be operating at the same time (or temporally proximate to each other); and therefore any determination that returns such results is questionable.

In this manner, a house specific model—initially premised upon a generic model—may be quickly determined, and may be continually updated based at least in part upon new information that is both house and neighborhood specific, and based at least in part on new or updated training data.

User Training. User training may allow a user to train the system when using the appliance. For example, through user training a system may learn various parameters of a pattern associated with a specific appliance, and may save or store such parameters for improved future detection of the same appliance.

There can be various methods of user training. For example, some methods in accordance with some embodiments of the present invention may include: (i) a user marking on a chart or informing the system when an appliance was used; (ii) a user using a program—such as a web or mobile program or app to indicate the stopping and starting times of an appliance; (iii) presenting a user with a determined use chart (in any format) and having the user correct the determined use chart based upon actual use; and/or (iv) a user providing answers to various questions, the questions based upon data collected or potential determined appliances or determined uses.

Figure 8:
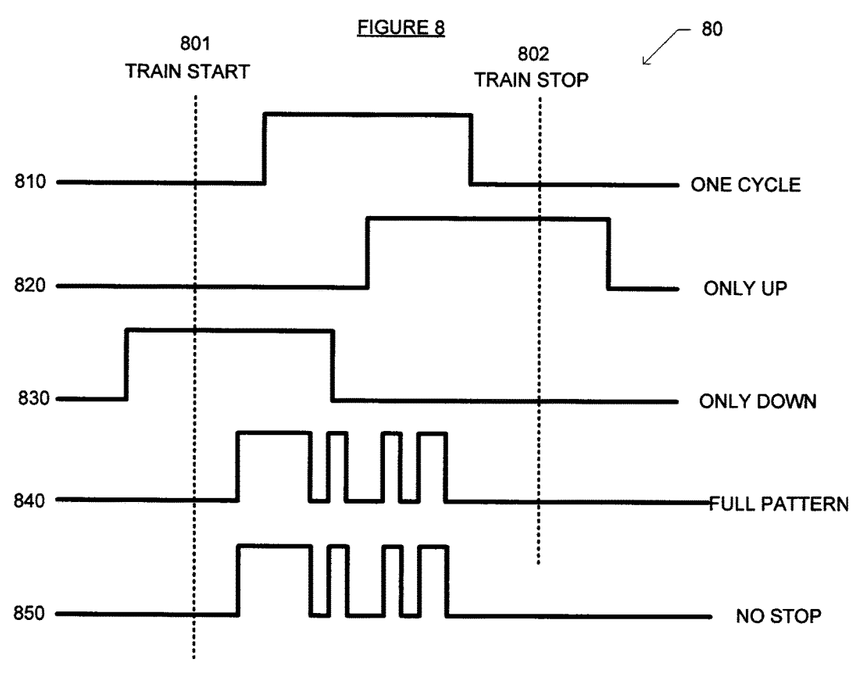
FIG. 8 depicts some examples of data time-series provided to a user from user training, in accordance with some embodiments of the present invention.

A user trained pattern and/or a user provided label may be stored in the system and analyzed to identify one or more parameters used to predict any appliance patterns. Such parameters may include, but are not limited to: amplitude, temperature at the time of training, time of the day, pattern width, downtime, length of usage, etc. With reference to FIG. 8, examples of a variety of time-series data which may be presented to a user screen or graphical user interface from user training, in accordance with some embodiments of the present invention, is depicted. User training based on such time-series data may be obtained using an program, applet, or app running on a computing device or mobile phone.

With continued reference to FIG. 8, various types of training data 80 may be received from the user. For example, a user may note a start time 801 and a stop time 802 of a cycle of a specific appliance. At 810 a usage pattern representative of a fully captured single cycle of an appliance may be seen. The user indicated training was to start before starting the appliance, and stopped training after the cycle was complete.

In contrast, a user may provide training data related to only one transition of an appliance. At 820 a user may start training and turn an appliance on, but may stop training before the appliance cycle is complete. Conversely at 830 a user may start training when an appliance is running, and stop training after the appliance has completed its cycle.

At 840 a full pattern of an operating appliance may be captured (for example, a full wash or dry cycle of a laundry appliance). At 850 a pattern of an operating appliance may be captured after training is started, but training may not be explicitly terminated by the user.

Each of training cycles 810, 820, 830, 840, 850 may provide information that may be used in disaggregating appliance signatures. For example, training cycle 810 may provide both an up and down transition, while training cycle 820 may provide up transition, while training cycle 830 may provide a down cycle. Training cycle 840 may provide a full pattern of various transitions that an appliance may exhibit during an operational cycle. Each of these may be utilized to provide additional information to better adapt disaggregation models.

Figure 9:
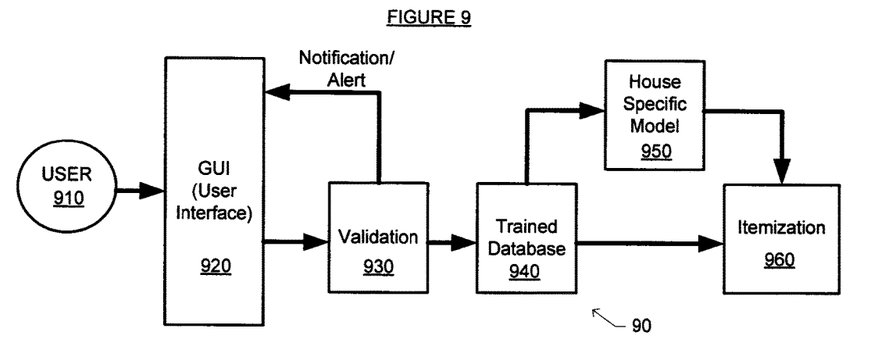
FIG. 9 depicts a process of validation and utilizing user training in accordance with some embodiments of the present invention.

With reference to FIG. 9, an exemplary process of user training in accordance with some embodiments of the present invention is illustrated. In general, a user may interact with a system through a user-training interface (which, again, may be on a computing device or mobile phone). Based upon a user's inputs, immediate validation and/or further validation of the trained data can be sent to the user via any number of channels, for example, through email or through notifications associated with a program or app. Validated trained data from the user may then be saved in a data store, such as a database associated with the system.

Validated trained data may be used to build a house specific model (HSM), which can be subsequently used for further appliance and/or usage itemization. Note that during training, some appliances that utilize a low power and constant run time as part of a base load may also be trained. For such appliances, the consumption may be estimated by the power jump compared to the total base load consumption.

With continued reference to FIG. 9, exemplary process 90 will now be discussed. A user 910 may interact with a graphical user interface 920, with which the user may validate at 930 the operation (or lack of operation) of identified appliances. It is contemplated that the user may receive alerts—such as notifications, emails, text messages, etc. from the system that may request the user to validate. For example, a text may be sent to a user's mobile telephone noting that the system has determined that a clothes dryer was recently turned on, and asking the user to confirm such use.

At 940 data that has been validated by the user may be provided to the trained database, which is a data store that may reside on any local or remote data storage device or medium.

The trained database 940 may provide information to contour the house specific model 950 of the specific user's house, and may appliance loads and energy usage may be itemized at 960.

Real Time Appliance Disaggregation. The ability to identify appliances in real time (or substantially real-time) is beneficial for a number of reasons. In addition to providing immediate validation of training data, such results allow for real time (or substantially real-time) consumer intervention. For example, if a user has just started running an appliance during a period of time with higher energy costs (i.e., peak pricing), a real time notification may be sent to the user informing the user of this fact and suggesting that if the appliance was instead run during off-peak hours, a specified amount of money may be saved. In addition, if an appliance is running longer than typical, a notice or alert may be sent to the user. For example, a cooking range may have been inadvertently left on. Alternatively, a user may desire to monitor the energy consumption of a particular appliance when the user is not home. For example, a user may want to be made aware of the first usage of HVAC in the beginning of a season, and/or may want to compare the energy consumption of the first usage to the usage of previous seasons (for example, to determine if the HVAC system needs to be maintained or optimized.

Note that notifications based upon real-time (or substantially real-time) appliance disaggregation may be sent to a user at various times. For example, such notifications or alerts may be sent seconds after an appliance starts running, or even minutes or hours later, or when the appliance has stopped operating and has completed its cycle. Thus, features that may be incomplete or may change during the operation of an appliance may be used as input of appliance classification as the appliance is operating and data streaming is received. At least two (2) approaches may be used to solve this problem. First, multiple classification models may be built on various combinations of incomplete features, and as feature sets change, a different model may be chosen as the most appropriate. Second, a single classification model may be built on the minimum features required, and as more data is obtained (in the case of real-time disaggregation, streams into the system) a consistent model may be applied.

Figure 10:
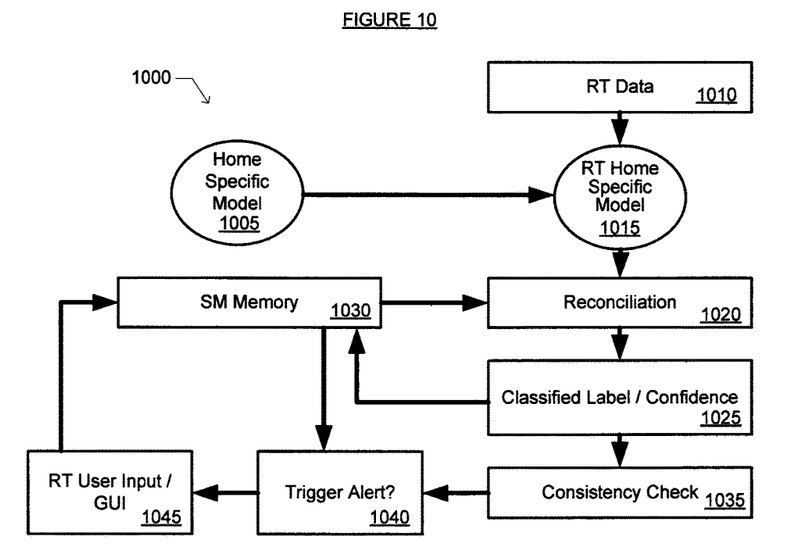
FIG. 10 illustrates a flow chart or process of real time (or substantially real time) disaggregation, in accordance with some embodiments of the present invention.

Moreover, a one state-machine may be useful or even required for a specific appliance to record the current running status and trigger notification at different status of state-machine. With reference to FIG. 10, a process 1000 of real time disaggregation in accordance with some embodiments of the present invention is depicted. In general, real time (RT) data and/or data substantially real time (such as data captured several minutes prior) 1010 may be provided to a house specific model (RT HSM) 1015, which may be built using an incomplete set of features provided by a HSM 1005 for each user. A state machine (SM) memory 1030 for a given appliance may be used to store the current running status: for example, a start, cycle on, cycle off, and stop. SM memory may further comprise expiration logic provided by appliance itemizations, and even common sense of a system, user, or operator.

Reconciliation 1020 may then be conducted between a classified appliance label 1025 from a real time house specific model and a state machine memory for such classified appliance in order to provide consistent results. A classified appliance label 1025 may then be stored or saved, and may be used to update the state machine 1030 of the corresponding classified appliance. Further, an additional consistency check 1035 may optionally be applied to confirm historical real time disaggregation in a longer time range (for example, one or more days). A classified appliance label 1025 and state machine status may be provided into the logic or algorithm of a trigger alert 1040, which may in turn ensure that the alert is displayed or provided to a user (for example, via a user interface) 1045, at the proper or desired time. Such proper or desired time may prevent inundating a user with various alerts, potentially diluting the impact of significant or useful alerts. Note that a user may also provide feedback in real time (or substantially real time) to the disaggregation system by confirming or refuting a classified appliance label to the state machine 1030. If a user refutes a classified appliance label, the user may provide a correct label which may be used to update the state machine (potentially in real-time or substantially real-time update the state machine), which may then be used for non-real time disaggregation at a later time.

Figure 11:
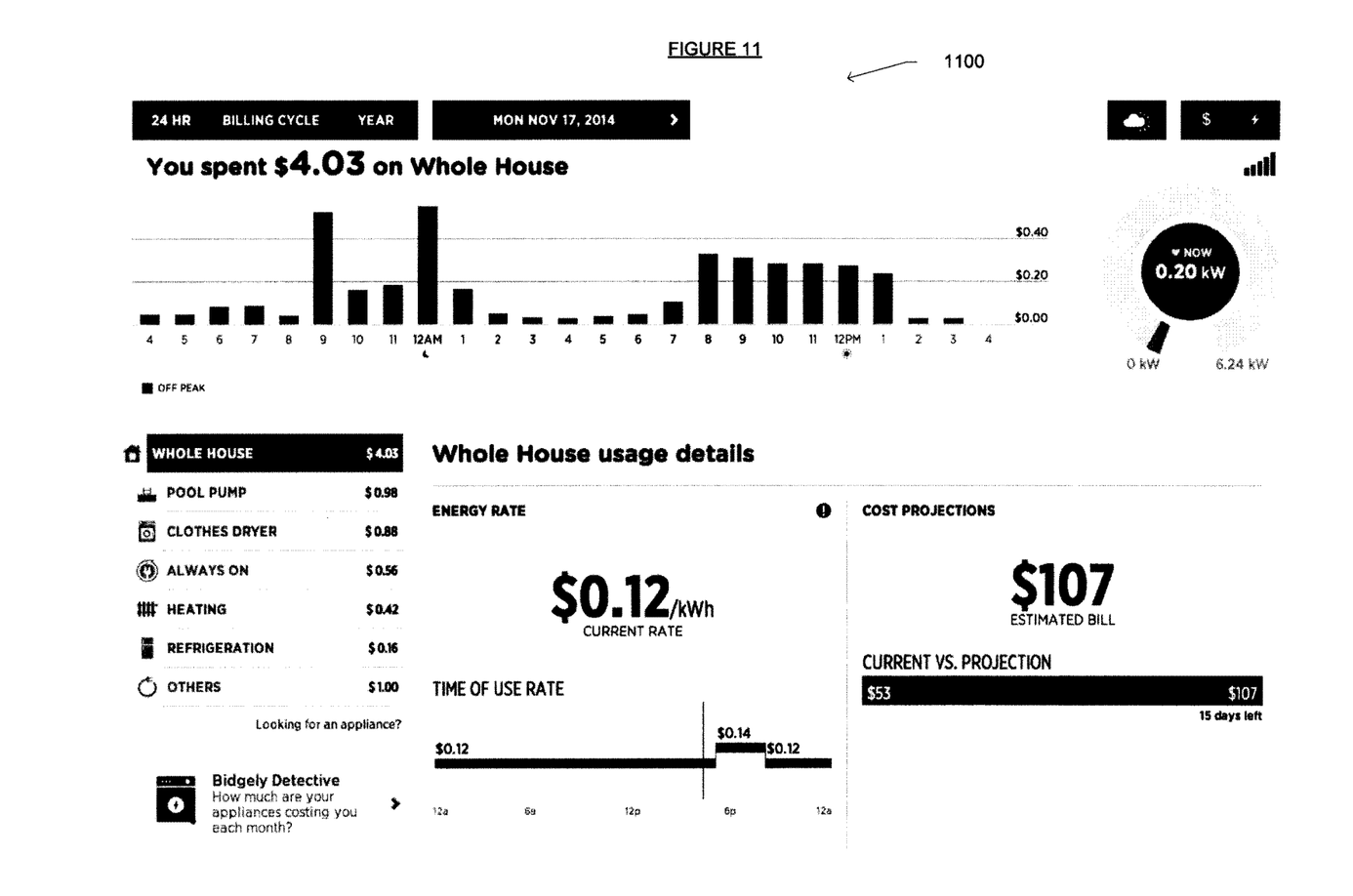
FIG. 11 illustrates an exemplary user dashboard that may operate on a graphical user interface, in accordance with some embodiments of the present invention.

With reference to FIG. 11, an exemplary user dashboard 1100 will now be discussed. Exemplary user dashboard may operate on a graphical user interface that may be on a standalone device, smart phone, mobile phone, computer, laptop, table, smart watch, etc. Such information may also be presented through a program, application, or "app" running on any of the same. Such dashboard 1100 may present the user with various information, such as but not limited to disaggregated appliance data (indicating the cost of running specific appliances such as a pool pump, clothes dryer, heating, refrigeration, etc.), the applicable energy rate for the whole house, and the projected cost of the next utility bill. Information may also be presented showing a user the times of usage (either per twent-four hours, billing cycle, or for the year). Current usage may also be indicated, for example "0.20 kW".

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense.

What is claimed is:

1. A method for performing energy disaggregation of a whole-house energy usage waveform from a specific house using a generic model and a house specific model, based at least in part on a whole-house energy profile and training data, the method utilizing a data store comprising records of appliance training data characterized by features related to disaggregation quality, the records resulting from disaggregation results from a plurality of homes unrelated with the received whole-house waveform, the method performing energy disaggregation by steps comprising:
   determining if a house specific model exists for the specific house;
   pairing impulses identified in the whole-house energy usage waveform to indicate an appliance cycle, pairing impulses comprising pairing at least one up transition with at least one down transition;
   bundling two or more impulses including impulses associated with different functions of the appliance, to indicate paired impulses that are representative of a full appliance cycle; and
   classifying the bundles of transitions in accordance with bundles exhibited by similar appliances with similar characteristics, first if the house specific model exists for the specific house, using it to classify at least some of the bundles to a type of appliance, then using the generic model to classify at least some of the bundles to a type of appliance; and
   updating the house specific model incrementally, using bundles that were classified with high confidence by the generic model, and using these classified bundles to retrain the house specific model.

2. The method of claim 1, wherein the whole-house energy usage profile is received from a smart meter, and wherein results of the energy disaggregation are displayed to a user on a graphical user interface.

3. The method of claim 1, wherein pairing impulses utilizes a greedy algorithm to search for matching impulses.

4. The method of claim 3, further comprising using historical impulses as a seed or starting point in pairing impulses to increase convergence speed of the software module.

5. The method of claim 1, wherein bundling impulses utilizes an unsupervised cluster analysis.

6. The method of claim 5, wherein the unsupervised cluster analysis is based at least in part on extracted features selected from the group consisting of amplitude of transition, time of day, time of week, impulse duration, overlap with other impulses, and running time stamp.

7. The method of claim 1, wherein the classification of the bundles is based at least in part on user segmentation of one or more characteristics selected from the group consisting of country, house, size, and zip code.

8. The method of claim 7, wherein determining a type of appliance associated with the bundles of transitions and classifying the bundles are based at least in part on selective communication with the data store, the data store comprising trained data, and wherein the bundles are classified further based on trained data comprising bundles that were manually and properly labeled.

9. The method of claim 1, wherein the training data is selected from the group consisting of classified confidence scores, power variation in running cycles, and consistency degree based at least in part on historical data.

10. The method of claim 1, further comprising the step of wherein by determining, based on predetermined criteria of time and accuracy, optimal or near optimal algorithms of pairing and bundling.

11. A method for performing energy disaggregation of a whole-house energy usage waveform from a specific house using a generic model and a house specific model, based at least in part on a whole-house energy profile, and training data, the method utilizing a data store comprising records of appliance training data characterized by features related to disaggregation quality, the records resulting from disaggregation results from a plurality of homes unrelated with the specific house, the method performing energy disaggregation by steps comprising:

determining if a house specific model exists for the specific house, pairing impulses identified in the whole-house energy usage waveform to indicate an appliance cycle, comprising pairing at least one up transition with at least one down transition;

bundling two or more impulses including impulses associated with different functions of the appliance to indicate paired impulses that are representative of a full appliance cycle;

determining a type of appliance associated with bundles at least in part by first, if the house specific model exists for the specific house, using it to classify the bundles to a type of appliance, and then using the generic model to classify the bundles to a type of appliance, the classification of bundles based at least in part on other bundles exhibited by similar appliances with similar characteristic known to the generic model, such classification of bundles based at least in part on user segmentation selected from the group consisting of country, house size, and zip code; and updating the house specific model incrementally, using bundles classified with high confidence by the generic model and using these classified bundles to retrain the house specific model.

12. The method of claim 11, wherein the whole-house energy usage profile is received from a smart meter, and wherein the results of the energy disaggregation are displayed to a user on a graphical user interface.

13. The method of claim 12, wherein bundling impulses utilizes an unsupervised cluster analysis.

14. The method of claim 11, wherein the training data may be characterized by features, including features related to disaggregation quality, selected from the group consisting of classified confidence scores, power variation in running cycles, and consistency degree based at least in part on historical data.

* * * * *